Aug. 22, 1950 M. MAGES 2,519,681
TONOMETER HEAD
Filed July 27, 1946
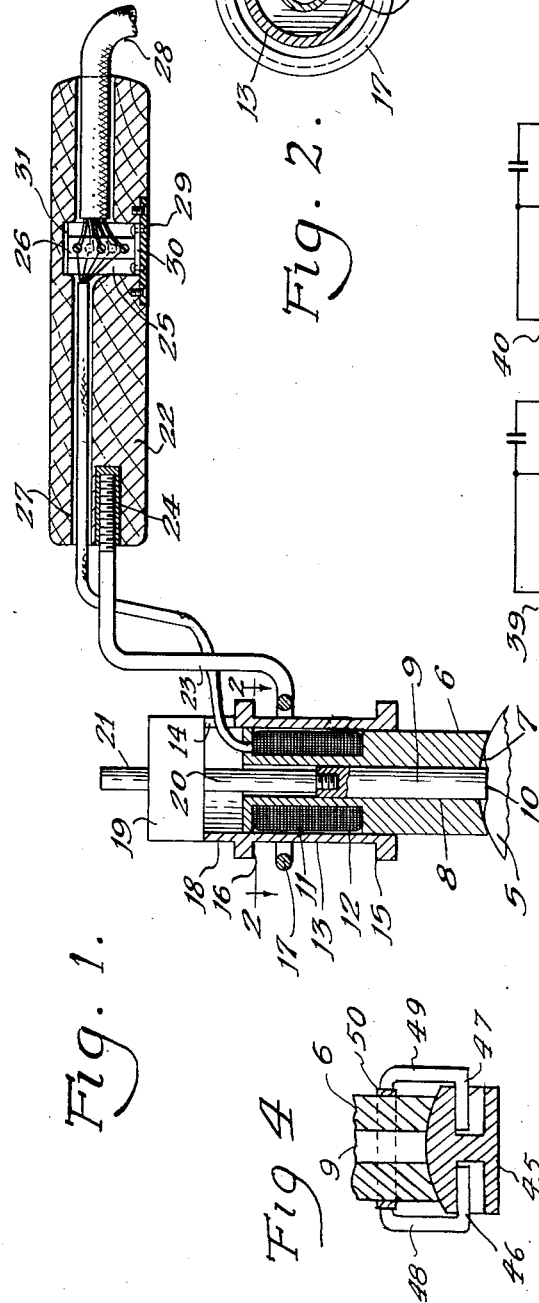
INVENTOR.
Morris Mages
BY Greek Wells
Attorney Patented Aug. 22, 1950

2,519,681

UNITED STATES PATENT OFFICE 2,519,681

TONOMETER HEAD

Morris Mages, Chicago, Ill., assignor to V. Mueller & Company, Chicago, Ill., a corporation of Illinois Application July 27, 1946, Serial No. 686,702

2 Claims. (Cl. 73—80)

My invention relates to tonometers. These instruments are used in the medical profession for making measurements of the pressure of liquid in the eyeball. The instruments now used for this purpose, with which I am familiar, are quite difficult to handle being of such construction that it is quite a delicate task to make the measurement. The scale for measurement is limited in size, and there is quite a problem of keeping the plunger that engages the eyeball from being influenced by friction and by inaccuracies that result from use.

It is the purpose of my invention to provide a novel tonometer which is so constructed that application of it to the human eye and the measurement of the pressure can be accomplished easily, and to any sensitivity that is desired, the measurement being translated into current flow that can be measured to whatever accuracy is desired by a suitable meter.

It is a further purpose of my invention to provide an improved tonometer wherein the head thereof is capable of being set directly on the eye and supported entirely by the eye in a stable position while the measurement is being made.

Another purpose of the invention is the provision of a novel supporting means for the tonometer whereby, when it is being applied, free movement in all directions is provided, thereby assuring perfect alignment of the tonometer head with the curvature of the eyeball.

It is a further purpose to provide such an instrument in which a calibrated "standard" is incorporated in the circuit by means of which any deviation in the accuracy of the tonometer head, changes in line voltage, or aging of tubes, can be easily detected. Provision is made for easily compensating for any normal changes, so that the accuracy of the instrument can be maintained over a long period of time.

A further purpose of my invention is to provide a simple means of mounting the plunger whereby to avoid cams, pivots and the like, and thus reduce frictional errors to a minimum.

Other objects and advantages of the invention will appear from the following detailed description and the accompanying drawings disclosing a preferred embodiment of my invention. It should be understood, however, that the drawings and description are illustrative only and are not to be taken as limiting the invention except insofar as it is limited by the claims.

In the drawings:

Figure 1 is a vertical sectional view showing the tonometer in use;

Figure 2 is a sectional view taken on the line 2—2 of Figure 1;

Figure 3 is a wiring diagram illustrating the electrical connections of the tonometer, and Figure 4 is a fragmentary view illustrating the manner of clamping the tonometer plunger in place for initially adjusting the instrument.

Referring now to the tonometer as illustrated in Figures 1 and 2, the parts shown are on an enlarged scale. The eye under test is indicated at 5. No attempt is made herein to discuss the reasons for testing the liquid pressure within the eyeball since the testing and the use made of the knowledge gained thereby are matters for the medical profession. The measurement is, for example, important in the diagnosis of Glaucoma. The present invention is directed entirely to perfection of the instrument for making the pressure measurements so that the measurement may be made with greater accuracy, and the accuracy is maintainable throughout the life of the instrument. All dimensions, curvatures and weights conform to American Medical Association (A. M. A.) standards.

The tonometer comprises a head 6 of a suitable non-magnetic metal such as brass. This head has its lower end 7 cupped out to substantially conform to the shape of the eyeball surface. A central passage 8 is provided through the head for a plunger 9. This plunger has its lower end also cupped to fit the eyeball as indicated at 10. The plunger is composed at least in part of a magnetic material such as iron, for a purpose that will presently appear.

The upper portion of the head 6 is cut out at 11 to form a spool for the coils 12. A sleeve 13 is fitted snugly over the spool portion of the head 6. The sleeve encloses the coil and has an opening at 14 for the leads to the coil. A shoulder 15 is formed on the sleeve at its lower end. A similar shoulder 16 is formed on the sleeve near its upper end. These shoulders serve as stops for a ring 17 that fits loosely around the sleeve 13. The sleeve 13 projects above the upper end of the head 6 somewhat as shown as 18, to form a stop for a head 19 on a stem 20 which carries the plunger 9. The stem 20 and the head 19 are of brass, and the stem is threaded into the upper end of the plunger. The proportions are preferably such that the lower limit of movement of the plunger and stem assembly at which the head 19 rests on the part 18 of the sleeve 13 will bring the lower cupped end 10 of the plunger substantially level with the lower edge of the head 6. This prevents the plunger from being let down too far, and protects the eye. A reduced extension 21 projects above the head 19 for the addition of auxiliary weights to measure higher pressures.

The ring 17 is secured to a handle 22 by a bent rod 23, one end of which is integral with the ring 17, and the other end of which is threaded into a sleeve 24 fixed in the handle 22. The handle is also provided with a pocket 25 in which a connector strip 26 is mounted. The wires in the coil 12 are fine wires, and leads of fine wires are brought from the coil in a cable form through a passage 27 in the handle to the strip 26. A cord 28 having wires of the size usually employed for appliances is used to make connection from the strip 26 to the metering circuit and current source. The pocket 25 is closed by a plate 29, and the connector strip 26 has end flanges 30—31 for positioning it in the pocket.

In Figure 3 of the drawings, the measuring circuit is shown diagrammatically as an induction bridge type of measuring circuit. In this circuit the tonometer head coil is shown at 32, a standard coil is shown at 33, and the balance coil is shown at 34. Each coil is shown as comprising a primary coil and a secondary coil. The primary coils are connected to a source 35 of alternating current. The output leads 36 and 37 of the secondary coils are connected through a phase adjuster 38 to an amplifier tube 39. This tube and a second tube 40 form an amplifier by which the signal is amplified and transmitted to a third tube 41, the plate circuit of which includes a meter 42, and a source 43 of current. The sensitivity or compensation control is obtained by a variable connection 44 to the grid of the tube 41.

The phase adjustment unit 38 is merely to bring the unbalance signal in phase with the plate voltage of the indicator tube 41. Normally when the plunger 9 is positioned so that its surface 10 coincides with the curved face 7 of the head 6, the voltage in the secondary of coil 32 (wound oppositely to the coils 33 and 34) is balanced against the voltage of the standard and balance coils so that the leads 36 and 37 are at the same potential. When the tonometer head is placed on the cornea of the eye, the weight of the plunger bearing against the eye causes the plunger to sink downward against the fluid pressure within the eyeball. The change in the position of the iron plunger in the coil 12 will cause a change in the secondary voltage so that a balance condition will no longer exist, and one of the leads 36—37 will be at a different potential than the other. This will cause a signal to be transmitted through the amplifier tubes the intensity of which is measurable by the meter 42.

In practice the instrument is first checked for accuracy and adjusted by comparison with the internal "standard" so as to insure accurate measurement. This is done as follows:

A holding member 45 (of brass) of the proper curvature is clamped to the bottom of the tonometer head to align the plunger with the "foot" of the tonometer head. This member (see Figure 4) is pivoted loosely on two pivot pins 46 and 47 that extend from two rods 48 and 49 toward each other. The rods are carried by a split ring 50 that can be clamped upon the head 6 when the member 45 is in proper position. With the intrument plugged in, the adjustment for the "standard" coil is set at its zero or normal position. The meter pointer is then set at zero on the scale by manipulation of the control for the "balance" coil. The "standard" coil 33 is now adjusted to change its value a predetermined amount, and this should result in a meter needle movement of a certain number of divisions—also marked on the meter dial by a red line. If the adjustment of the "standard" does not check with the required movement of the meter needle, they are made to coincide by means of the sensitivity control 44. The member 45 is then detached from the tonometer head, and the instrument is ready for use.

From the foregoing description it is believed that the nature and advantages of my invention will be clear to those skilled in the art.

Having thus described my invention, I claim:

1. In a tonometer, a substantially cylindrical head of nonmagnetic material, said head having a cupped lower face to engage the eyeball surface, said head having a central passage from said face to the upper end of the head, said head also having a spool portion on the exterior thereof intermediate its ends, an electrically conductive coil wound upon said spool portion, a plunger composed in part of magnet material slidable in said passage, indicating means connected with the coil to indicate changes in the magnetic circuit about said coil effected by movement of the plunger, a sleeve covering the spool portion of said head and projecting above the head, a handle having a head supporting ring portion in which said sleeve is loosely suspended and cooperating stop members on the sleeve and plunger limiting downward movement of the plunger, but leaving the plunger free for removal upwardly out of said head.

2. A tonometer comprising a head having a cupped lower face for resting on an eyeball, an electrically conductive coil carried by said head, a plunger freely slidable in said head and extending through the coil and having an end face for engaging an eyeball upon which the head is resting, said plunger having a part of magnetic material, means connected with said coil for indicating changes in the magnetic circuit about said coil effected by movement of the plunger, a ring encircling the head loosely, spaced upper and lower shoulders on the head retaining the ring, and a handle to which the ring is fixed.

MORRIS MAGES.

REFERENCES CITED

The following references are of record in the file of this patent:

UNITED STATES PATENTS

| Number | Name | Date |
|---|---|---|
| 1,419,134 | Goldstein | June 13, 1922 |
| 1,743,461 | La Force | Jan. 14, 1930 |
| 1,855,757 | Harrison | Apr. 26, 1932 |
| 2,178,471 | De Bruin | Oct. 31, 1939 |
| 2,276,843 | Hathaway | Mar. 17, 1942 |
| 2,314,514 | Parsons | Mar. 23, 1943 |